United States Patent [19]

Suhoza et al.

[11] Patent Number: 4,933,374

[45] Date of Patent: Jun. 12, 1990

[54] STABILIZER COMPOSITIONS FOR POLYOLS AND POLYURETHANE FOAM

[75] Inventors: Richard A. Suhoza; Bruce R. Garney, both of Norwalk, Conn.

[73] Assignee: R. T. Vanderbilt Company, Inc., Norwalk, Conn.

[21] Appl. No.: 356,159

[22] Filed: May 24, 1989

[51] Int. Cl.⁵ .............................................. C08G 18/14
[52] U.S. Cl. ................... 521/117; 252/403; 252/182.26; 252/182.27; 521/128; 521/129
[58] Field of Search .................. 521/117, 128, 129; 252/403, 182.26, 182.27

[56] References Cited

U.S. PATENT DOCUMENTS

| | | | |
|---|---|---|---|
| 2,530,769 | 11/1950 | Hollis | 252/401 |
| 3,567,664 | 3/1971 | Haring | 260/2.5 |
| 3,637,865 | 1/1972 | Haring | 260/611.5 |
| 4,007,230 | 2/1977 | Hinze | 260/611.5 |
| 4,010,211 | 3/1977 | Preston et al. | 260/611.5 |
| 4,596,836 | 6/1986 | Kimball et al. | 521/117 |
| 4,677,154 | 6/1987 | Narayan et al. | 524/710 |
| 4,794,126 | 12/1988 | Fesman et al. | 521/117 |
| 4,824,601 | 4/1989 | Franklin | 252/401 |

OTHER PUBLICATIONS

K. C. Frisch and J. H. Saunders, ed., Plastic Foams, Part 1, 118–125 (1972).

G. L. Statton and J. M. Gaul, *Evaluation of Hindered Phenols for Minimization of Foam Discoloration Using the Microwave Scorch Test*, 20, J. Cellular Plastics, 346–50 (1984).

*Primary Examiner*—Maurice J. Welsh
*Attorney, Agent, or Firm*—Rasma B. Balodis

[57] ABSTRACT

Polyether polyols and polyurethane foams are stabilized by including therein a stabilizer composition of 2,6-di-tert-butyl-4-sec-butylphenol and a reaction product of diisobutylene, styrene and diphenylamine wherein the ratio of the phenol to the reaction product is about 1:5 to 5:1. The stabilizer composition may further include trihydrocarbyl phosphite to stabilize the color of same.

8 Claims, No Drawings

STABILIZER COMPOSITIONS FOR POLYOLS AND POLYURETHANE FOAM

BACKGROUND OF THE INVENTION

The present invention concerns stabilization of polyoxyalkylene polyether polyols and the use of the stabilized polyols in the preparation of polyurethane foam. In particular the invention relates to stabilization of polyols with certain liquid stabilizer compositions and the color or scorch inhibition of flexible and semiflexible polyurethane foams made from the stabilized polyols.

Prior art methods for stabilization of polyoxyalkylene polyether polyols with antioxidants or stabilizers and the use of the stabilized polyols in the preparation of polyurethane foams to inhibit scorch are well known.

U.S. Pat. No. 3,567,664 and U.S. Pat. No. 3,637,865 disclose polyurethane foams stabilized with a mixture of butylated hydroxytoluene (BHT) and p,p'-dialkyldiphenylamine. U.S. Pat. No. 4,010,211 teaches the addition of phenothiazine to the BHT/p,p'-dialkyldiphenylamine mixture. U.S. Pat. No. 4,794,126 discloses flame retardant polyurethane foams stabilized with a stabilizer package of diarylarylenediamine reaction product of diarylamine and alkyl ketone and a hindered phenol, in particular 3,6'-di-tert-butyl-4-sec-butylphenol. Statton, *Evaluation of Hindered Phenols for Minimization of Foam Discoloration Using the Microwave Scorch Test*, 20 J. CELLULAR PLASTICS 346 (1984) studied four phenols in combination with the solid antioxidant p,p'-dioctyldiphenylamine alone and in the presence of phenothiazine. Although systems with BHT were fairly effective, systems of 2,6-di-tert-butyl-4-sec-butylphenol and p,p'-dioctyldiphenylamine did not provide satisfactory scorch resistance.

Surprisingly, it has been discovered that good scorch resistance is imparted to polyurethane foams by utilizing novel liquid stabilizer compositions. The liquid compositions not only provide good color and scorch control for polyurethane foams, but also eliminate certain processing disadvantages associated with presently utilized solid stabilizer systems.

Conventional solid stabilizers are generally dissolved in the polyol media by heating. To remove any undissolved stabilizer solids, the entire voluminous polyol mass is subjected to a filtration step. Only then the polyol precursor can be cured to the final foam product.

Advantageously, the present liquid stabilizer compositions are readily soluble in the polyol media at ambient temperatures. Consequently, two steps of the conventional process may be eliminated: dissolution of the stabilizer in the polyol media by heating and removal of undissolved stabilizer solids by filtration. Furthermore, the liquid stabilizer compositions may be added to the polyol by metering or pumping for convenience and safety.

SUMMARY OF THE INVENTION

According to the invention, there are provided polyoxyalkylene polyether polyol compositions stabilized against oxidative degradation with a stabilizing amount of a synergistic mixture of 2,6-di-tert-butyl-4-sec-butylphenol and a reaction product of diisobutylene, styrene and diphenylamine wherein the ratio of the phenol to the reaction product is about 1:5 to 5:1.

Another aspect of the invention concerns a method for the stabilization of a polyoxyalkylene polyether polyol against oxidative degradation and the use of the stabilized polyol together with polyisocyanates to prepare scorch stabilized polyurethane foam, wherein the polyol contains about 0.01 to 5.0 percent by weight of a synergistic mixture consisting of 2,6-di-tert-butyl-4-sec-butylphenol and a reaction product of diisobutylene, styrene and diphenylamine.

DETAILED DESCRIPTION OF THE INVENTION

The synergistic stabilizer or antiscorch composition is composed of known compounds. The liquid reaction product of diisobutylene, styrene and diphenylamine is prepared in the presence of a Friedel-Craft condensation catalyst according to the method described in U.S. Pat. No. 2,530,769 and is herein incorporated by reference. The weight ratio of diisobutylene to styrene ranges from about 2:1 to 5:1, preferably from 3:1 to 4:1 and the mole ratio of the hydrocarbon mixture containing diisobutylene and styrene to diphenylamine ranges from about 1.3:1 to 2:1, preferably from 1.3:1 to 1.5:1.

The composite liquid reaction product consists of octylated and styrenated derivatives such as p,p'-di-tert-octyldiphenylamine, p,p'-di-α-phenylethyldiphenylamine, p-tert-octyl-p'-phenylethyldiphenylamine, p-tert-octyldiphenylamine, p-phenylethyldiphenylamine and tri-tert-octyldiphenylamine. In addition, the product contains butylated derivatives which are produced when the tert-octyl group having the structural formula

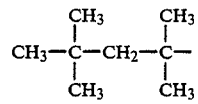

is split into two tert-butyl groups by the catalyst producing derivatives such as p-tert-butyldiphenylamine, p,p'-di-tert-butyldiphenylamine, p-tert-octyl-p'-tert-butyldiphenylamine, p-tert-butyl-p'-phenylethyldiphenylamine and minor amounts of other unidentified reaction products.

For preparation of the stabilizer of the invention, preferred are reaction products containing about 50 to 80 percent of mixed octylated derivatives, p-tert-octyldiphenylamine, p-tert-octyl-p'-tert-butyldiphenylamine, p,p'-di-tert-octyldiphenylamine, p-tert-octyl-p'-phenylethyldiphenylamine and tri-tert-octyldiphenylamine and about 50 to 20 percent of mixed butylated and styrenated diphenylamine derivatives.

The second component of the stabilizer composition, 2,6-di-tert-butyl-4-sec-butylphenol, is a known material available commercially under the trade name VANOX®1320 (distributed by R. T. Vanderbilt Company, Inc.)

Unexpectedly, the reaction product and the phenol compound produce synergistic antioxidant effect in polyols when combined in certain critical ratios. Synergism is displayed by compositions containing about 1 to 5 parts by weight of the reaction product to about 5 to 1 parts by weight of the phenol compound.

The antioxidant composition has a tendency to discolor upon standing. To prolong shelf-life of the composition, it is advantageous to add about 0.5 to 10.00 percent of trihydrocarbyl phosphite wherein the hydrocarbyl group may be independently selected from phenyl and alkyl groups. Preferred are alkyl derivatives having 5 to 13 carbons and higher. Particularly preferred are the compounds tridecyl phosphite and phenyl diisodecyl phosphite.

The compositions of the invention may be incorporated in the polyol precursors in an amount effective to produce the desired stability. Typically, an amount from about 0.01 to 5.0 percent will be sufficient. A preferred range is from about 0.3 to 1.0 percent by weight of the total polyol composition. Due to their liquid nature, the stabilizer composition may be incorporated into the polyol by simply stirring at ambient temperatures.

The polyol components which may be stabilized with the stabilizer composition of the invention include polyoxyalkylene polyether polyols having 2 to about 10 hydroxy groups. Particularly suitable polyols include those having a molecular weight of about 200 to 10,000 or higher. Preferred are polyols derived from diols and triols with a molecular weight ranging from 1000 for diols to 6000 for triols.

The polyether polyols possess two or more ether groups in the molecule. The polyols are derived from, among others, ethylene oxide, propylene oxide, epichlorohydrin, styrene oxide, diethylene glycol, triethylene glycol, trimethylolpropane, glycerine, hexanetriol, butanetriol and the like. Polyether polyols suitable for preparation of flexible polyurethane foams and methods of their preparation are described in K. C. Frisch and J. H. Saunders, ed., PLASTIC FOAMS, Part 1, 118–125 (1972).

In the preparation of flexible polyurethane foams, the stabilized polyol compositions are reacted with a polyisocyanate containing two or more —N=C=O groups per molecule in the presence of catalysts, surfactants, water and optionally, auxiliary blowing agents. Commercially available polyisocyanates include, among others, toluene -(2,4 and/or 2,6)-diisocyanate, 4,4'-diphenylmethane diisocyanate, polyisocyanate from aniline-formaldehyde oligomers (PAPI manufactured by Carwin Co.) and aliphatic isocyanates such as methylcyclohexane diisocyanate and the like.

Because of increased safety considerations, flexible and semiflexible polyurethane may contain flame retardants. The latter are known compounds containing phosphorus, antimony, boron, bismuth and halogen or combinations thereof. The polyurethane may contain other additives such as fillers, plasticizers, reodorants, ultraviolet and thermal stabilizers and the like.

The data hereinbelow are intended to illustrate, but not to limit the scope of the invention. Unless otherwise stated, all parts and percentages in the specification and claims are expressed by weight.

EXAMPLE I

Scorch resistance of polyurethane foams was determined by microwave scorch test.

The specimens given in Table I were prepared by mixing the ingredients in a high intensity mixer, pouring into 35×35×13.75 cm cardboard box and recording the cream and rise time (health bubbles). The foamed specimens were placed in a microwave oven at 30% power for 7.5 minutes, rotated 180 degrees and microwaved for 7.5 minutes. Thereafter, the specimens were placed in a 121° C. forced air convection oven for 2 minutes to cure skin and then allowed to cure for 30 minutes at room temperature. The peak exotherm was measured for 10 minutes with a digital thermometer. The cured foam was cut open and discoloration was determined by visual inspection.

Specimen 1 contained no stabilizer and was severely discolored. Specimen 2 contained one of the components of the stabilizer composition of the invention, 2,6-di-tert-butyl-4-sec-butylphenol and was severely discolored. Specimen 3 contained the other component of the stabilizer composition, reaction product of diisobutylene, styrene and diphenylamine containing about 73 percent octylated diphenylamine derivatives and 27 percent mixed butylated and styrenated diphenylamine derivatives. Similarly specimen 3 was discolored.

Specimens 4, 5 and 6 contained synergistic mixtures of the invention and showed no or slight discoloration due to improved scorch resistance.

The above embodiments and illustrations have shown various aspects of the present invention. Other variations will be evident to those skilled in the art and such modifications are intended to be within the scope of the invention as defined in the appended claims.

TABLE I

| COMPONENTS | COMPOSITIONS, PARTS | | | | | |
| --- | --- | --- | --- | --- | --- | --- |
|  | 1 | 2 | 3 | 4 | 5 | 6 |
| Polyether polyol[1] | 100.00 | 100.00 | 100.00 | 100.00 | 100.00 | 100.00 |
| Distilled water | 4.00 | 4.00 | 4.00 | 4.00 | 4.00 | 4.00 |
| Silicone surfactant[2] | 1.00 | 1.00 | 1.00 | 1.00 | 1.00 | 1.00 |
| Amine catalyst[3] | 0.25 | 0.25 | 0.25 | 0.25 | 0.25 | 0.25 |
| Flame retardant[4] | 7.00 | 7.00 | 7.00 | 7.00 | 7.00 | 7.00 |
| Tin catalyst[5] | 0.14 | 0.14 | 0.14 | 0.14 | 0.14 | 0.14 |
| Toluene diisocyanate | 53.63 | 53.63 | 53.63 | 53.63 | 53.63 | 53.63 |
| 2,6-Di-tert-butyl-4-sec-butylphenol | — | 0.40 | — | 0.20 | 0.30 | 0.10 |
| Reaction product[6] | — | — | 0.40 | 0.20 | 0.10 | 0.30 |
| Scorch | Very Severe | Very Severe | Very Severe | Very Light | Very Light | Very Light |

[1]NIAX ® 16-52 manufactured by Union Carbide Company
[2]NIAX L-5750 manufactured by Union Carbide Company
[3]NIAX A 127 manufactured by Union Carbide Company
[4]Thermolin 101 manufactured by Olin Corporation
[5]NIAX D19 manufactured by Union Carbide Company
[6]VANLUBE ® SL-HP distributed by R. T. Vanderbilt Company, Inc.

What is claimed is:

1. A liquid stabilizer composition for reduction of scorch in polyurethane foams comprises
   (a) 2,6-di-tert-butyl-4-sec-butylphenol and
   (b) a reaction product of diisobutylene, styrene and diphenylamine wherein the weight ratio of diisobutylene to styrene ranges from about 2:1 to 5:1 and the mole ratio of the mixture of diisobutylene and styrene to diphenylamine ranges from about 1.3:1 to 2:1, and wherein the ratio of the phenol to the reaction product is about 1:5 to 5:1.

2. The stabilizer composition according to claim 1 which further contains about 0.5 to 10.0 percent by weight of trihydrocarbyl phosphite wherein the hydrocarbyl may be independently selected from phenyl and alkyl groups.

3. The stabilizer composition according to claim 1 which further contains about 0.5 to 10.0 percent by weight of tridecyl phosphite.

4. The stabilizer composition according to claim 1 wherein the reaction product contains about 50 to 80 percent of mixed octylated diphenylamine derivatives and about 50 to 20 percent of mixed butylated and styrenated diphenylamine derivatives.

5. A polyether polyol composition stabilized against degradation comprises a major portion of a polyether polyol having from 2 to 10 hydroxy groups and a minor stabilizing amount of a liquid stabilizer composition consisting of
(a) 2,6-di-tert-butyl-4-sec-butylphenol and
(b) a reaction product of diisobutylene, styrene and diphenylamine wherein the weight ratio of diisobutylene to styrene ranges from about 2:1 to 5:1 and the mole ratio of the mixture of diisobutylene and styrene to diphenylamine ranges from about 1.3:1 to 2:1 and wherein the ratio of the phenol to the reaction product is about 1:5 to 5:1.

6. The polyether polyol composition according to claim 5 wherein the stabilizer composition is present in the amount of 0.01 to 5.0 percent by weight.

7. The polyether polyol composition according to claim 5 wherein the reaction product contains about 50 to 80 percent of mixed octylated diphenyl derivatives and about 50 to 20 percent of mixed butylated and styrenated diphenylamine derivatives.

8. In the preparation of polyurethane foams by reacting a polyether polyol and polyisocyanate, the improved method of reducing discoloration due to scorch of polyurethane foams comprising the steps of (i) adding to the polyol about 0.01 to 5.0 percent by weight of a liquid stabilizer composition consisting of (a) 2,6-di-tert-butyl-4-sec-butyl phenol and (b) a reaction product of diisobutylene, styrene and diphenylamine wherein the weight ratio of diisobutylene to styrene ranges from about 2:1 to 5:1 and the mole ratio of the mixture of diisobutylene and styrene to diphenylamine ranges from about 1.3:1 to 2:1 and wherein the ratio of the phenol to the reaction product is about 1:5 to 5:1, (ii) stirring the polyol and stabilizer mixture at ambient temperature and (iii) curing in the presence of a reaction catalyst and foaming agent.

* * * * *